(No Model.)
H. G. SANDERS.
CHURN.
No. 433,909. Patented Aug. 5, 1890.
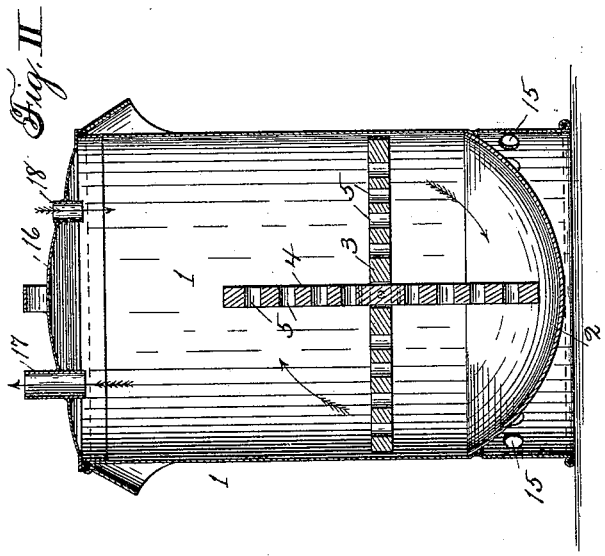
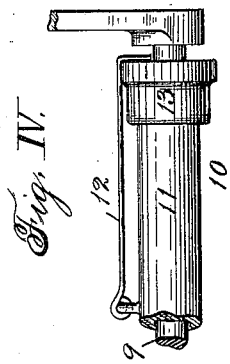
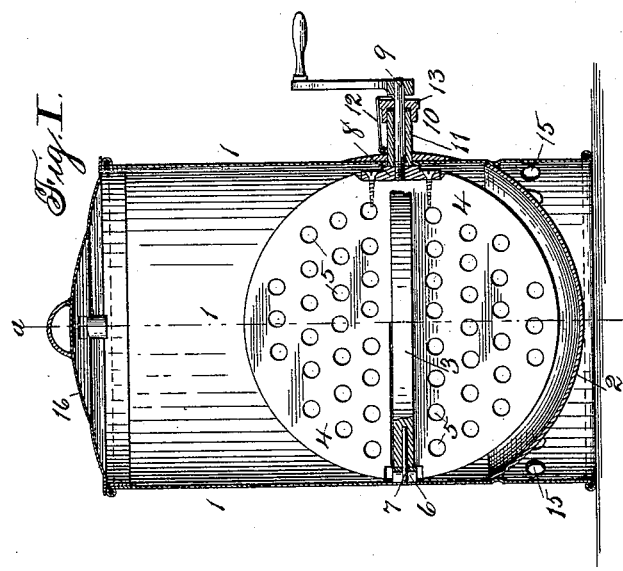
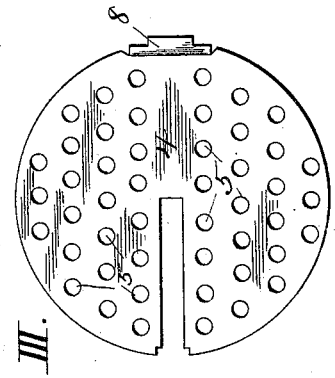
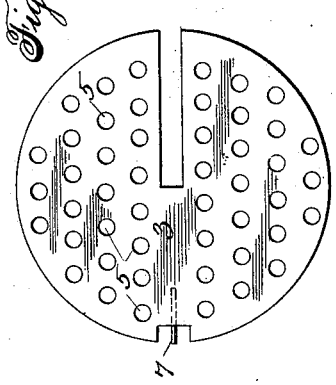
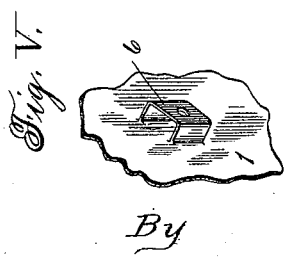
Witnesses:
J. G. Lopper.
S. H. Knight.
Inventor:
H. G. Sanders.
By Knight Bros
Attorneys.
THE NORRIS PETERS CO., PHOTO-LITHO., WASHINGTON, D. C.

UNITED STATES PATENT OFFICE.

HARRY GRAHAM SANDERS, OF LOUISIANA, MISSOURI, ASSIGNOR OF ONE-HALF TO FRANK J. POLLOK, OF SAME PLACE.

CHURN.

SPECIFICATION forming part of Letters Patent No. 433,909, dated August 5, 1890.

Application filed April 21, 1890. Serial No. 348,834. (No model.)

*To all whom it may concern:*

Be it known that I, HARRY GRAHAM SANDERS, a citizen of the United States, residing at Louisiana, in the county of Pike and State of Missouri, have invented certain new and useful Improvements in Churns, of which the following is a specification.

My invention relates to that class known as "crank-mechanism churns," and has for its object the production of pure sweet butter in a short space of time and to facilitate the operation of cleaning the churn and its parts after use.

In order that my invention may be fully understood, I will describe it with reference to the accompanying drawings, in which—

Figure I is a sectional view of my churn with all the parts ready for use. Fig. II is a similar view taken on the line $a\ a$, Fig. I. Fig. III shows two circular slotted plates with numerous perforations, which, when fitted together, form my improved dasher. Fig. IV is my improved stuffing-box and means of attachment to the shaft-tubing. Fig. V is a small section of the churn carrying a bracket-bearing for the pin on one of the dasher-plates.

The body 1 of the churn is cylindrical, having a hollow hemispherical or ball-shaped bottom 2, with its concave surface upward, so as to avoid all corners or creases in which sour cream or milk may accumulate, thus making it an easy matter to thoroughly cleanse the churn.

A separable dasher composed of two circular slotted plates 3 4, each of which has a number of perforations 5, is mounted upon bearings in such a position that the circumference of the revolving plates will be only one-fourth of an inch from the bottom and sides of the churn. Each of the circular plates above mentioned is slotted from its periphery to its center to enable the two to fit snugly together at right angles, forming a dasher with four perforated segments. At a suitable position on the inner surface of the churn is a bearing 6, above mentioned, for a pin 7 on one of the dasher-plates, and which does not communicate with the outside in order to prevent leaking. This bearing consists of a perforated bracket secured to the side of the churn. (See Fig. V.) At the diametrically-opposite point on the other plate is a lock-nut 8, into which the crank-shaft is screwed by passing through the side of the churn. Leaking in this direction is prevented by the stuffing-box 10, which will now be described.

In the side of the churn is passed a piece of metal tubing 11, in which the crank-shaft 9 works. Upon the upper outer side of this tubing is hinged or otherwise securely fastened a keeper 12, as shown in Fig. IV. A hollow nut 13, without threads, is fitted about the crank-shaft, and when said shaft is passed through tubing 11 and screwed into nut 8 the hollow nut 13 is filled with packing pressed up against and over the end of tubing 11 and firmly secured by the locking device 12. The pins, bearings, and shafts are all case-hardened. A row of perforations 15, leading to the space beneath the ball-bottom, is placed around the lower part of the churn for the purpose of regulating the temperature of the contents of the cylinder by means of the circulation of hot or cold water. This is secured by placing the churn in a vessel containing water of the desired temperature.

In the top 16 of the churn are two tubes, one two inches and the other one-half of an inch in length, the longer 17 of the two being placed over that portion of the churn toward which the sour gas from the cream will be directed by the current of air resulting from the revolution of the dasher, and the shorter 18 being placed on the opposite side of the cover to supply fresh air to take the place of the impure air discharged. This pure fresh air is caught by the dasher in its revolutions and thoroughly mixed in with the cream. By removing the sour gas from the cream and supplying fresh air to take its place the bad confined taste is entirely removed from the butter.

It will be seen that owing to the small space between the dasher and body of the churn a large part of the cream will have to pass through the numerous perforations in the dasher, so that it will be well beaten up and the butter quickly formed. During the churning the temperature of the cream is regulated by the water—hot or cold, as the case may be—in contact with the bottom of the churn, and the air in the churn itself is kept pure and fresh by means of the ventilating-tubes described. As soon as the churning is completed, the crank-shaft is unscrewed, the dasher lifted out of its bearings and separated, and the contents of the churn removed, when the different parts can be thoroughly cleaned without any difficulty.

Butter made by my improved churn is obtained in a minimum space of time and is of superior quality, being pure and sweet and entirely free from the sour confined taste heretofore noticed.

I desire it understood that I do not confine myself to any particular material in making my churn, the spirit of the invention being the same whether I use wood, tin, earthenware, or any other suitable material. When made of earthenware, the internal bearing for the dasher is simply molded on the inner side of the churn. The dasher also can be made of any suitable material, though I prefer wood or tin.

Having thus described my invention, the following is what I claim as new therein and desire to secure by Letters Patent:

1. The circular dasher constructed of two perforated disks, each slotted from one side to the center, fitted together at right angles to each other, one of said disks carrying a journal fitting in a stationary bearing and the other a nut for the reception of the crank-shaft, in combination with a crank-shaft screwed into said nut and the cylindrical body having a hemispherical bottom concentric, or nearly so, with the circular dasher, and within which said dasher works in close proximity, as herein shown and described.

2. The combination of the removable dasher 3 4, having a fixed nut 8, the removable threaded crank-shaft 9, screwing into said nut and secured to the dasher thereby, the tubular box 11, forming a bearing for the crank-shaft, the keeper 12, and the cap 13, held by said keeper, confining the packing around the shaft against the end of the box and permitting the ready insertion and withdrawal of the shaft when detached from the dasher without removing the cap.

HARRY GRAHAM SANDERS.

Witnesses:
WILLIAM WALLACE BIRKHEAD,
FRANK JOSEPH POLLOK.